US012608782B2

(12) United States Patent
Wen et al.

(10) Patent No.: US 12,608,782 B2
(45) Date of Patent: Apr. 21, 2026

(54) IMAGE PROCESSING METHOD AND RELATED APPARATUS FOR HIGH DYNAMIC RANGE AND COLOR GAMUT CONVERSION

(71) Applicant: HUAWEI TECHNOLOGIES CO., LTD., Shenzhen (CN)

(72) Inventors: Jinsong Wen, Shenzhen (CN); Jun Dai, Hangzhou (CN); Qiyan Zhai, Shenzhen (CN); Yanbing Jia, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 393 days.

(21) Appl. No.: 18/334,453

(22) Filed: Jun. 14, 2023

(65) Prior Publication Data

US 2023/0325986 A1     Oct. 12, 2023

Related U.S. Application Data

(63) Continuation of application No. PCT/CN2021/132247, filed on Nov. 23, 2021.

(30) Foreign Application Priority Data

Dec. 15, 2020     (CN) .......................... 202011473651.4

(51) Int. Cl.
| | |
|---|---|
| *G09G 3/20* | (2006.01) |
| *G06T 5/92* | (2024.01) |
| *H04N 23/88* | (2023.01) |

(52) U.S. Cl.
CPC ............. *G06T 5/92* (2024.01); *G09G 3/2003* (2013.01); *H04N 23/88* (2023.01);
(Continued)

(58) Field of Classification Search
CPC ............. G06T 5/92; G06T 2207/10024; G06T 2207/20208; G09G 3/2003;
(Continued)

(56) References Cited

U.S. PATENT DOCUMENTS

| | | | | |
|---|---|---|---|---|
| 2018/0270490 A1* | 9/2018 | Le Leannec | ......... | H04N 19/186 |
| 2019/0068969 A1* | 2/2019 | Rusanovskyy | ...... | H04N 19/186 |

(Continued)

FOREIGN PATENT DOCUMENTS

| | | |
|---|---|---|
| CN | 106488078 A | 3/2017 |
| CN | 110741624 A | 1/2020 |

OTHER PUBLICATIONS

Takeuchi et al. (IEEE Access; "Gamut-Extension Methods Considering Color information Restoration", pp. 80146-80158; https://ieeexplore.ieee.org/stamp/stamp.jsp?arnumber=8737954) Jul. 2, 2019 (Year: 2019).*
British Sky Broadcasting Ltd, Pedzisz ("Beyond BT.709", p. 1-13; https://www.researchgate.net/profile/Maciej-Pedzisz/publication/309915879_Beyond_BT709/links/5b4a4c9baca272c60943999c/Beyond-BT709.pdf), presented on SMPTE 2013 Annual Technical Conference & Exhibition (Year: 2013).*
(Continued)

*Primary Examiner* — Juan M Guillermety

(57) ABSTRACT

An image processing method and a related apparatus are provided, to support display of an HDR image, display more dynamic ranges and image details, provide richer colors, and improve user experience. The image processing method includes: obtaining a first RGB image sensed by a photographing apparatus; converting the first RGB image into a second RGB image meeting a BT2020 color gamut range; determining a first luminance value corresponding to the second RGB image, where the first luminance value indicates a maximum luminance of each frame of image in the second RGB image; determining a target image based on the first luminance value and the second RGB image; and sending the target image to a display apparatus for display.

12 Claims, 12 Drawing Sheets

(52) U.S. Cl.
CPC .............. *G06T 2207/10024* (2013.01); *G06T 2207/20208* (2013.01); *G09G 2340/06* (2013.01); *G09G 2360/16* (2013.01)

(58) Field of Classification Search
CPC ........... G09G 2340/06; G09G 2360/16; H04N 23/88; H04N 23/85; H04N 1/6058; H04N 1/6077; H04N 23/83; H04N 9/643
See application file for complete search history.

(56) References Cited

U.S. PATENT DOCUMENTS

| | | | |
|---|---|---|---|
| 2019/0342603 A1 | 11/2019 | Hirota et al. | |
| 2019/0356891 A1 | 11/2019 | Zhang et al. | |
| 2023/0282147 A1* | 9/2023 | Bogdanowicz ...... | G09G 3/2003 345/594 |

OTHER PUBLICATIONS

Office Action issued in CN202011473651.4, dated Nov. 2, 2022, 9 pages.

ITU-R BT.2020, Parameter values for ultra-high definition television systems for production and international programme exchange, Aug. 2012, total 7 pages.

SMPTE Standard, Dynamic Metadata for Color Volume Transform Application #1, SMPTE ST 2094-10:2016, May 18, 2016, total 15 pages.

SMPTE Standard, Dynamic Metadata for Color Volume Transform Application #4, SMPTE ST 2094-40:2016, Aug. 24, 2016, total 26 pages.

CEA Defines 'HDR Compatible' Displays, Consumer Electronics Association (CEA), Aug. 27, 2015, total 3 pages.

* cited by examiner

Photographing
apparatus

Display apparatus

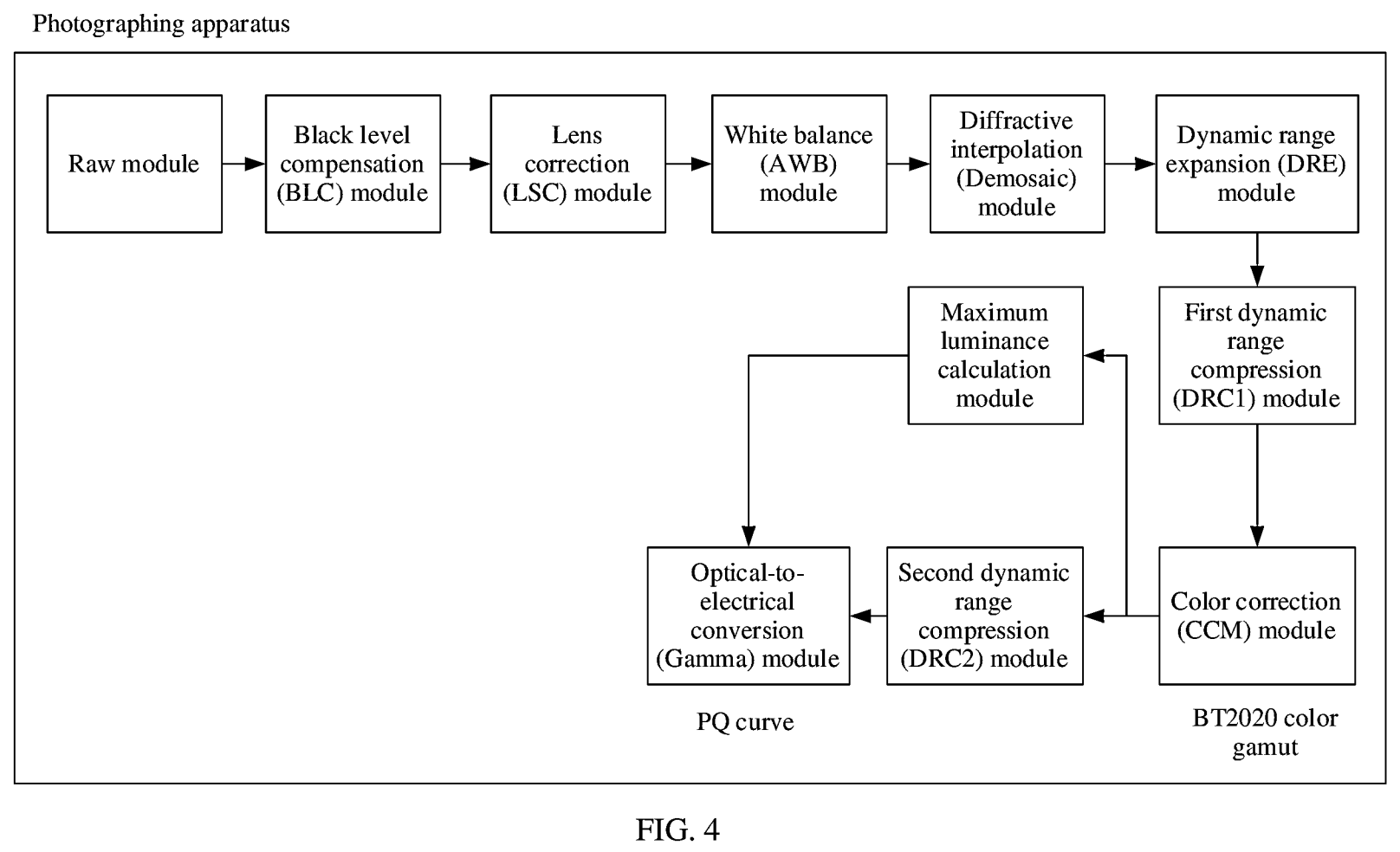

Photographing apparatus

Raw module → Black level compensation (BLC) module → Lens correction (LSC) module → White balance (AWB) module → Diffractive interpolation (Demosaic) module → Dynamic range expansion (DRE) module → First dynamic range compression (DRC1) module → Color correction (CCM) module Color correction (CCM) module → Maximum luminance calculation module Color correction (CCM) module → Second dynamic range compression (DRC2) module Maximum luminance calculation module → Optical-to-electrical conversion (Gamma) module Second dynamic range compression (DRC2) module → Optical-to-electrical conversion (Gamma) module BT2020 color gamut PQ curve

FIG. 4

C (color value)

Minimum distance policy

C (color value)

Maximum color value policy

C (color value)

Contrast ratio policy

C (color value)

Maximum luminance value policy

C (color value)
Adaptation policy

IMAGE PROCESSING METHOD AND RELATED APPARATUS FOR HIGH DYNAMIC RANGE AND COLOR GAMUT CONVERSION

CROSS-REFERENCE TO RELATED APPLICATIONS

This application is a continuation of International Application No. PCT/CN2021/132247, filed on Nov. 23, 2021, which claims priority to Chinese Patent Application No. 202011473651.4, filed on Dec. 15, 2020. The disclosures of the aforementioned applications are hereby incorporated by reference in their entireties.

TECHNICAL FIELD

The present disclosure relates to the image processing field, and specifically, to an image processing method and a related apparatus.

BACKGROUND

In recent years, with rapid development of smartphones, surveillance cameras, autonomous driving, and the like, people have an increasingly strong need for high-quality images and videos. In addition, with continuous improvement of image processing technologies, different image processing standards are gradually proposed.

In the conventional technologies, a photographing apparatus captures an image to obtain relative red, green, and blue (RGB) data of the image, and a color gamut of the RGB data is mapped to an sRGB color gamut. Then the photographing apparatus sends the RGB data of the image meeting the sRGB color gamut to a display apparatus, and the display apparatus performs color mapping or transparently transmits the image of the sRGB color gamut based on a display capability of the display apparatus. However, the RGB data of the image captured by the photographing apparatus is quantized relative data, and a maximum luminance of the image is unclear. Consequently, luminance corresponding to the image sent to the display apparatus is a relative concept, and an absolute luminance of the image is lost. As a result, the display apparatus cannot accurately display a real luminance of the image. In addition, the photographing apparatus directly limits a color gamut range of the image to the sRGB color gamut. Consequently, color information of the image is lost, and the display apparatus cannot display a lost color of the image.

Therefore, when a user has an increasingly strong need for a high dynamic range (HDR) image, the conventional technologies are limited to the sRGB color gamut, and display of an HDR image cannot be supported. Consequently, no more dynamic ranges or image details can be displayed for the user, causing poor user experience.

SUMMARY

Embodiments of the present disclosure provide an image processing method and a related apparatus, to support display of an HDR image, display more dynamic ranges and image details, provide richer colors, and improve user experience.

In view of this, embodiments of the present disclosure provide the following solutions.

According to a first aspect, an embodiment of the present disclosure provides an image processing method. The method is applied to a photographing apparatus, and the method may include: obtaining a first RGB image, where the first RGB image is an RGB image sensed by a photographing apparatus; converting the first RGB image into a second RGB image, where the second RGB image is an image meeting a BT2020 color gamut range; determining a first luminance value corresponding to the second RGB image, where the first luminance value indicates a maximum luminance of each frame of image in the second RGB image; determining a target image based on the first luminance value and the second RGB image; and sending the target image to a display apparatus, so that the display apparatus displays the target image. In the foregoing manner, in the photographing apparatus, the first RGB image is converted into the second RGB image meeting the BT2020 color gamut range, the first luminance value of the second RGB image is determined, and then the target image matching an actual luminance status is re-determined based on the second RGB image, so that the display apparatus can finally display the target image. The described target image may be an HDR image that displays more image details, richer colors, and the like.

In some embodiments, the converting the first RGB image into a second RGB image may include: determining a first conversion matrix, where the first conversion matrix is a conversion matrix meeting the BT2020 color gamut range; and determining the second RGB image based on the first conversion matrix and the first RGB image.

In some embodiments, before the determining a first luminance value corresponding to the second RGB image, the method may further include: obtaining first information, where the first information indicates an aperture value, an exposure time, a gain value, or optical-to-electrical conversion efficiency of the photographing apparatus; and correspondingly, the determining a first luminance value corresponding to the second RGB image includes: determining a second conversion matrix and a white balance matrix, where the second conversion matrix is used to indicate conversion between a luminance value of an RGB image sensed by the photographing apparatus and a luminance value of an image in a preset observer space; determining a second luminance value based on the second RGB image, the first conversion matrix, the second conversion matrix, the white balance matrix, and the first information, where the second luminance value indicates a luminance of each frame of image in the second RGB image; and determining the first luminance value based on the second luminance value, the first conversion matrix, the second conversion matrix, the white balance matrix, and the first information.

In some embodiments, the determining a second conversion matrix and a white balance matrix may include: determining a third luminance value based on the second RGB image and the first information, where the third luminance value indicates a luminance of each frame of image in the first RGB image; obtaining a luminance value of an image in a preset observer space; determining the second conversion matrix based on the third luminance value and the luminance value of the image in the preset observer space; and performing white balance on the luminance value of the image in the preset observer space to obtain the white balance matrix.

According to a second aspect, an embodiment of the present disclosure provides another image processing method. The method is applied to a display apparatus, and the method may include: receiving a target image sent by a photographing apparatus; and displaying the target image.

In some embodiments, after the receiving a target image sent by a photographing apparatus, the method may further include: receiving a first luminance value sent by the photographing apparatus, where the first luminance value indicates a maximum luminance of each frame of image in a second RGB image, and the second RGB image is an image meeting a BT2020 color gamut range; and obtaining display information, where the display information indicates a display capability of the display apparatus; and correspondingly, the displaying the target image includes: performing gamut mapping on the target image based on the first luminance value, the display information, and a preset gamut mapping policy, to display a target image obtained through gamut mapping. In the foregoing manner, after the display apparatus receives the target image and the first luminance value, in combination with the display information of the display apparatus that can indicate the display capability, the display apparatus performs gamut remapping on the target image based on the display information, the first luminance value, and the preset gamut mapping policy, for example, performs luminance and color remapping, and then displays a target image obtained through gamut remapping, so that the finally displayed target image can display richer image details and colors.

In some embodiments, the method may further include: adjusting a dynamic range of the target image based on the first luminance value and the display information. In the foregoing manner, the display apparatus may further adjust the dynamic range of the target image based on the first luminance value and the display information, so that the target image can display image details, colors, and the like to the maximum extent.

According to a third aspect, an embodiment of the present disclosure provides a photographing apparatus. The photographing apparatus may include: an obtaining unit, configured to obtain a first RGB image, where the first RGB image is an RGB image sensed by the photographing apparatus; a processing unit, configured to convert the first RGB image into a second RGB image, where the second RGB image is an image meeting a BT2020 color gamut range, where the processing unit is configured to determine a first luminance value corresponding to the second RGB image, where the first luminance value indicates a maximum luminance of each frame of image in the second RGB image; and the processing unit is configured to determine a target image based on the first luminance value and the second RGB image; and a sending unit, configured to send the target image to a display apparatus, so that the display apparatus displays the target image.

In Some Embodiments, the Processing Unit is Further Configured to:

determine a first conversion matrix, where the first conversion matrix is a conversion matrix meeting the BT2020 color gamut range; and determine the second RGB image based on the first conversion matrix and the first RGB image.

In some embodiments, the obtaining unit is further configured to: before the first luminance value corresponding to the second RGB image is determined, obtain first information, where the first information indicates an aperture value, an exposure time, a gain value, or optical-to-electrical conversion efficiency of the photographing apparatus; and the processing unit is further configured to:

determine a second conversion matrix and a white balance matrix, where the second conversion matrix is used to indicate conversion between a luminance value of an RGB image sensed by the photographing apparatus and a luminance value of an image in a preset observer space;

determine a second luminance value based on the second RGB image, the first conversion matrix, the second conversion matrix, the white balance matrix, and the first information, where the second luminance value indicates a luminance of each frame of image in the second RGB image; and determine the first luminance value based on the second luminance value, the first conversion matrix, the second conversion matrix, the white balance matrix, and the first information.

In Some Embodiments, the Processing Unit is Further Configured to:

determine a third luminance value based on the second RGB image and the first information, where the third luminance value indicates a luminance of each frame of image in the first RGB image;

obtain a luminance value of an image in a preset observer space;

determine the second conversion matrix based on the third luminance value and the luminance value of the image in the preset observer space; and perform white balancing on the luminance value of the image in the preset observer space to obtain the white balance matrix.

According to a fourth aspect, an embodiment of the present disclosure provides a display apparatus, and the display apparatus may include:

a receiving module, configured to receive a target image sent by a photographing apparatus; and a display module, configured to display the target image.

In Some Embodiments, the Receiving Module is Further Configured to:

after receiving the target image sent by the photographing apparatus, receive a first luminance value sent by the photographing apparatus, where the first luminance value indicates a maximum luminance of each frame of image in a second RGB image, and the second RGB image is an image meeting a BT2020 color gamut range; and obtain display information, where the display information indicates a display capability of the display apparatus; and correspondingly, the display module is configured to:

perform gamut mapping on the target image based on the first luminance value, the display information, and a preset gamut mapping policy, to display a target image obtained through gamut mapping.

In Some Embodiments, the Display Apparatus May Further Include:

a processing module, configured to adjust a dynamic range of the target image based on the first luminance value and the display information.

According to a fifth aspect, an embodiment of the present disclosure provides an image processing system. The image processing system may include the photographing apparatus according to any one of the first aspect or the possible implementations of the first aspect, and the display apparatus according to any one of the second aspect or the possible implementations of the second aspect.

According to a sixth aspect, an embodiment of the present disclosure provides a photographing apparatus. The photographing apparatus may include a processor and a memory, or include an input/output (I/O) interface, a processor, and a memory. The memory stores program instructions. The processor is configured to execute the program instructions stored in the memory, so that the photographing apparatus performs the image processing method according to any one of the first aspect or the possible implementations of the first aspect.

According to a seventh aspect, an embodiment of the present disclosure provides a display apparatus. The display apparatus may include a processor and a memory, or include an input/output (I/O) interface, a processor, and a memory. The memory stores program instructions. The processor is configured to execute the program instructions stored in the memory, so that the display apparatus performs the image processing method according to any one of the second aspect or the possible implementations of the second aspect.

According to an eighth aspect, the present disclosure provides a computer-readable storage medium. The computer-readable storage medium stores instructions. When the instructions run on a photographing apparatus, the photographing apparatus is enabled to perform the image processing method according to any one of the first aspect or the possible implementations of the first aspect.

According to a ninth aspect, the present disclosure provides a computer-readable storage medium. The computer-readable storage medium stores instructions. When the instructions run on a display apparatus, the display apparatus is enabled to perform the image processing method according to any one of the second aspect or the possible implementations of the second aspect.

According to a tenth aspect, the present disclosure provides a computer program product including instructions. When the computer program product runs on a photographing apparatus, the photographing apparatus is enabled to perform the image processing method according to any one of the first aspect or the possible implementations of the first aspect.

According to an eleventh aspect, the present disclosure provides a computer program product including instructions. When the computer program product runs on a display apparatus, the display apparatus is enabled to perform the image processing method according to any one of the second aspect or the possible implementations of the second aspect.

According to a twelfth aspect, the present disclosure provides a chip system. The chip system includes a processor, configured to support a photographing apparatus in implementing the functions according to any one of the first aspect or the possible implementations of the first aspect. In a possible design, the chip system further includes a memory, and the memory is configured to store program instructions and data that are necessary for the photographing apparatus. The chip system may include a chip, or may include a chip and another discrete component.

According to a thirteenth aspect, the present disclosure provides a chip system. The chip system includes a processor, configured to support a display apparatus in implementing the functions according to any one of the second aspect or the possible implementations of the second aspect. In a possible design, the chip system further includes a memory, and the memory is configured to store program instructions and data that are necessary for the display apparatus. The chip system may include a chip, or may include a chip and another discrete component.

For technical effects of any one of the implementations of the third aspect, the sixth aspect, the eighth aspect, the tenth aspect, and the twelfth aspect, refer to technical effects of different implementations of the first aspect.

For technical effects of any one of the implementations of the fourth aspect, the seventh aspect, the ninth aspect, the eleventh aspect, and the thirteenth aspect, refer to technical effects of different implementations of the second aspect.

It can be learned from the foregoing technical solutions that embodiments of the present disclosure have the following advantages:

In embodiments of the present disclosure, after obtaining the first RGB image, the photographing apparatus converts the first RGB image into an image meeting the BT2020 color gamut range, and then determines the first luminance value corresponding to the second RGB image, and determines the target image based on the first luminance value and the second RGB image. Further, the display apparatus performs luminance and color remapping on the target image based on the first luminance value, the display information, and the preset gamut mapping policy, so that the finally displayed target image can display richer image details and image colors. This improves image display effects and further improves user experience.

BRIEF DESCRIPTION OF DRAWINGS

FIG. 4 is a flowchart of processing an image by a photographing apparatus according to the present disclosure;

DESCRIPTION OF EMBODIMENTS

Embodiments of the present disclosure provide an image processing method and a related apparatus, to support display of an HDR image, display more dynamic ranges and image details, provide richer colors, and improve user experience.

The following clearly describes technical solutions in embodiments of the present disclosure with reference to accompanying drawings in embodiments of the present disclosure. Clearly, the described embodiments are some but not all of embodiments of the present disclosure. All other embodiments obtained by persons of ordinary skill in the art based on embodiments of the present disclosure without creative efforts shall fall within the protection scope of the present disclosure.

In the specification, claims, and accompanying drawings of the present disclosure, the terms "first", "second", "third", "fourth", and the like (if existent) are intended to distinguish between similar objects but do not necessarily indicate a specific order or sequence. It should be understood that data used in this way is interchangeable in appropriate circumstances, so that embodiments of the present disclosure described herein can be implemented in orders other than the order illustrated or described herein. In addition, the terms "include", "have", and any variants thereof are intended to cover non-exclusive inclusion.

Compared with a common image, an HDR image can provide more dynamic ranges and image details, and display richer colors. Therefore, a user has an increasingly strong need for an HDR image.

Figure 1:
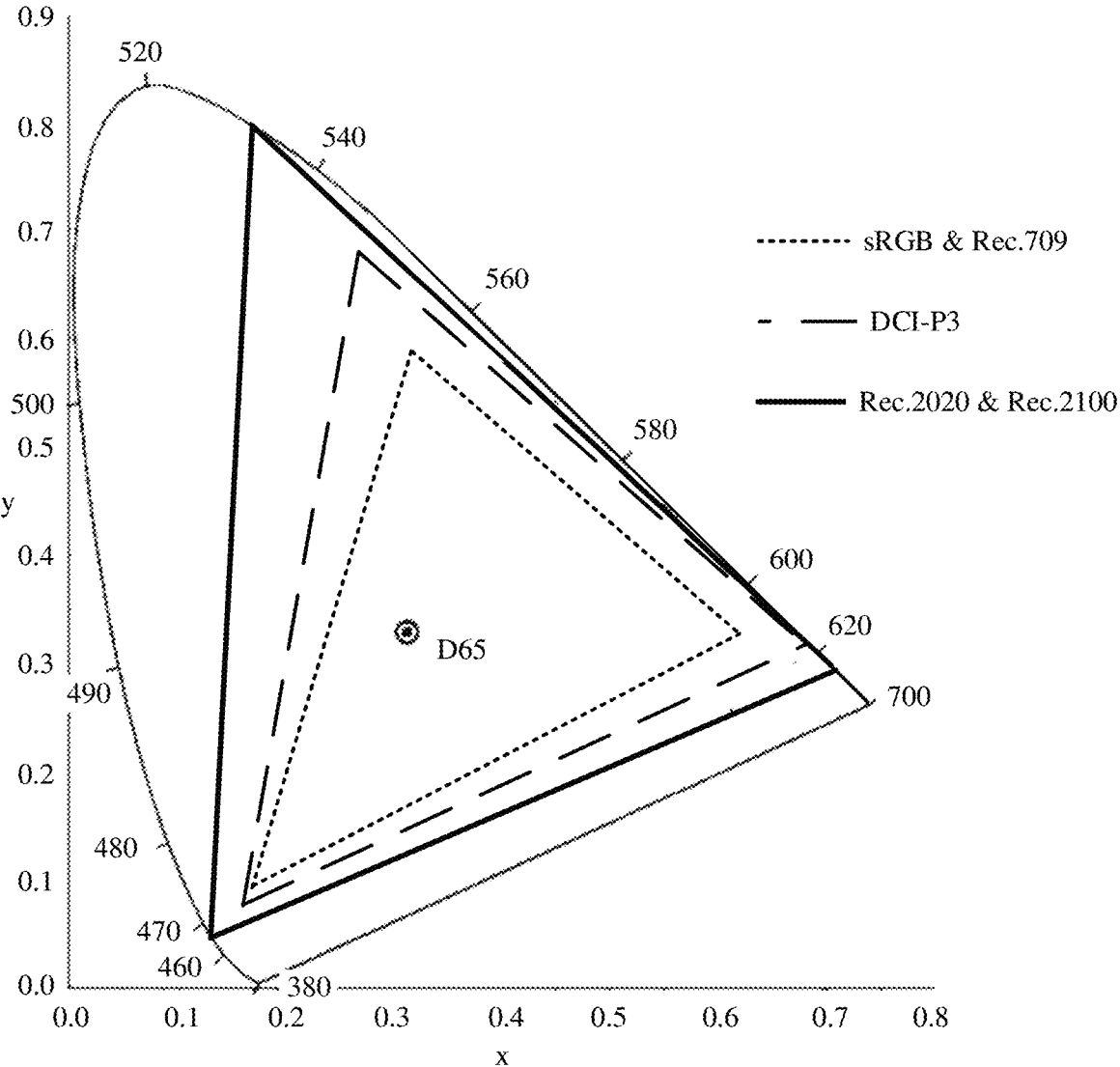
FIG. 1 is a schematic diagram of comparison between color gamut ranges in different standards.

FIG. 1 is a schematic diagram of comparison between color gamut ranges in different standards. It can be learned from FIG. 1 that triangles with different sizes are respectively used to represent a color gamut range Rec.2020 & Rec.2100 in an HDR standard, a color gamut range in a DCI-P3 standard, and a color gamut range sRGB & Rec.709 in an sRGB standard, and pixel positions of a white point D65 in the foregoing three standards are shown. Clearly, it can be learned that a size of a triangle corresponding to the Rec.2020 & Rec.2100 is larger than a size of a triangle corresponding to the DCI-P3, which is larger than a size of a triangle corresponding to the sRGB & Rec. 709. In other words, a color gamut range in the HDR standard is far greater than that in the sRGB standard. A color gamut may be understood as a complete subset of a color of an image, for example, a given color space, or a color display range of a display apparatus during image display. Therefore, when the color gamut range in the HDR standard is far greater than that in the sRGB standard, display of an HDR image can enable a user to see more image details, richer colors, and the like.

However, in the conventional technology, a photographing apparatus captures an image to obtain relative RGB data of the image, and a color gamut of the RGB data is mapped to an sRGB color gamut. Then the photographing apparatus sends the RGB data of the image meeting the sRGB color gamut to a display apparatus, and the display apparatus performs color mapping or transparently transmits the image of the sRGB color gamut based on a display capability of the display apparatus. However, the RGB data of the image captured by the photographing apparatus is quantized relative data, and a maximum luminance of the image is unclear. Consequently, luminance corresponding to the image sent to the display apparatus is a relative concept, and an absolute luminance of the image is lost. As a result, the display apparatus cannot accurately display a real luminance of the image. In addition, the photographing apparatus directly limits a color gamut range of the image to the sRGB color gamut. Consequently, color information of the image is lost, and the display apparatus cannot display a lost color of the image. As a result, the user cannot see more information about details, colors, and the like of the image.

Figure 2:
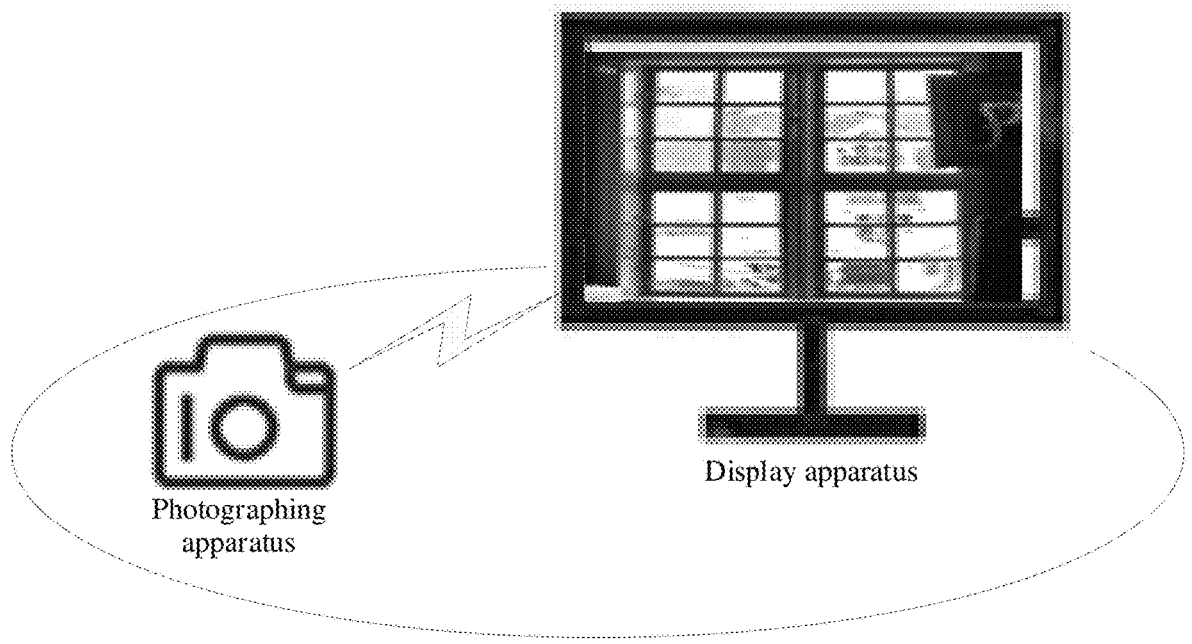
FIG. 2 is a schematic diagram of an application scenario according to an embodiment of the present disclosure.

Therefore, to resolve the foregoing problems, embodiments of the present disclosure provide an image processing method, so that an image captured by a photographing apparatus can be converted into an RGB image meeting an HDR standard. Then a maximum luminance of the RGB image meeting the HDR standard is determined, and a dynamic range of the RGB image is dynamically adjusted based on the maximum luminance. In this way, a display apparatus can display a real color and a real luminance of an image to the maximum extent, to display more image details and rich colors. FIG. 2 is a schematic diagram of an application scenario according to an embodiment of the present disclosure. It can be learned from FIG. 2 that a photographing apparatus photographs a window to generate a corresponding image, and a display apparatus displays the image. It may be understood that the photographing apparatus and the display apparatus may be mounted in one terminal device, for example, a smartphone, a tablet computer, or another device. Alternatively, the photographing apparatus and the display apparatus may be separately mounted in different terminal devices. For example, the photographing apparatus may be mounted in a terminal device with only a photographing function, for example, a camera or a video recorder, and the display apparatus may be mounted in a terminal device with only a display function, for example, a television without a camera. The photographing apparatus and the display apparatus that are separately mounted in different terminal devices may communicate with each other through Bluetooth, wireless fidelity (Wi-Fi), or another network. This is not limited herein. It may be understood that FIG. 2 is merely a schematic diagram of a photographing apparatus and a display apparatus that are mounted in different terminal devices.

Figure 3:
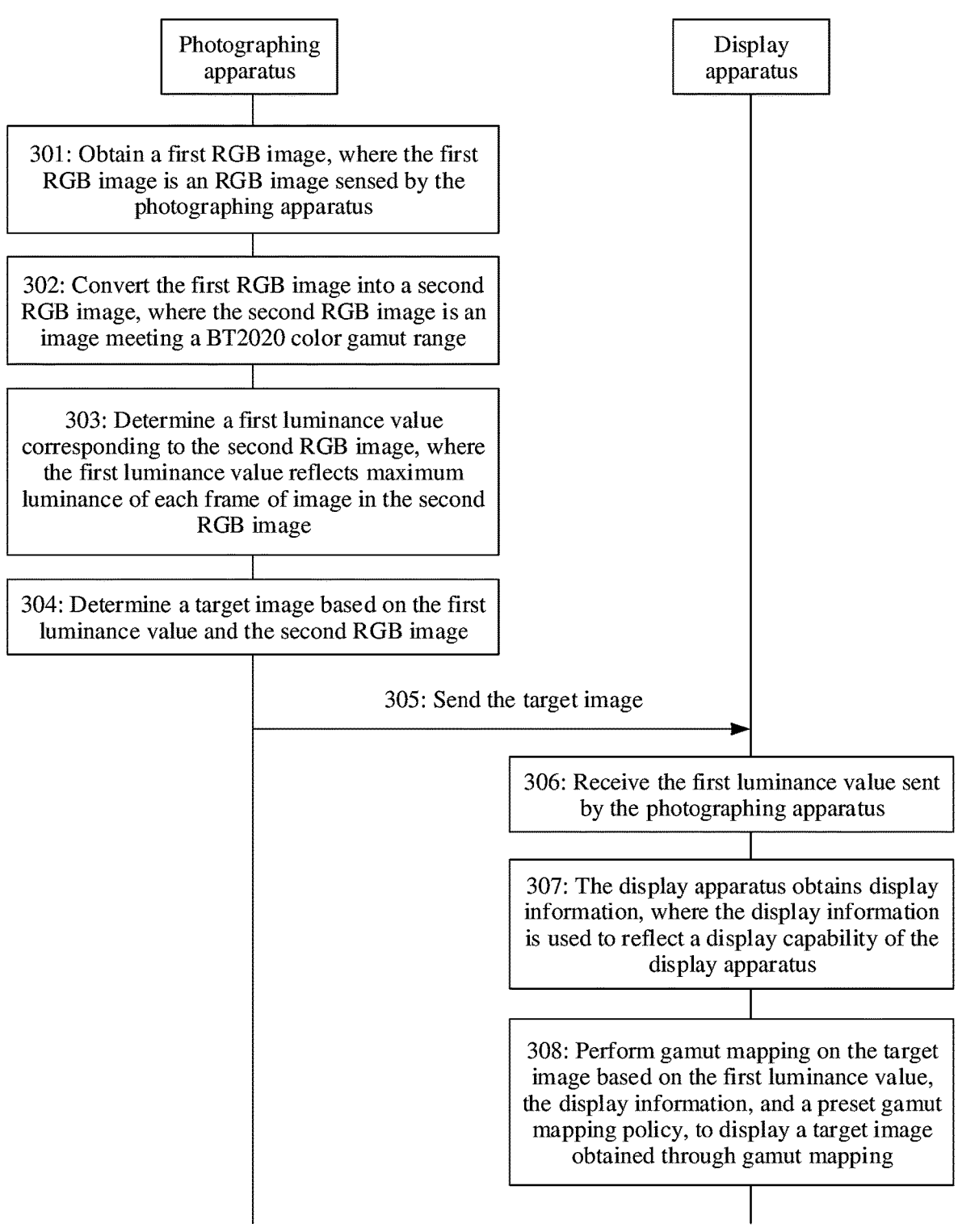
FIG. 3 is a flowchart of an image processing method according to an embodiment of the present disclosure.

The following describes in detail the image processing method provided in embodiments of the present disclosure. FIG. 3 is a flowchart of an image processing method according to an embodiment of the present disclosure. The flowchart may include the following steps.

301: A photographing apparatus obtains a first RGB image, where the first RGB image is an RGB image sensed by the photographing apparatus.

In this embodiment, after photographing a photographed object or the like, the photographing apparatus may obtain a first RGB image of the photographed object. It may be understood that the first RGB image is an RGB image that can be sensed by the photographing apparatus and that has not undergone color gamut space conversion.

FIG. 4 is a flowchart of processing an image by a photographing apparatus according to an embodiment of the present disclosure. It can be learned from FIG. 4 that, the photographing apparatus first captures, by using a raw module, original information of a photographed object that is transmitted from a sensor, and the original information sequentially passes a black level compensation (BLC) module, a lens correction (lens shading correction, LSC) module, a white balance (automatic white balance, AWB) module, a diffractive interpolation demosaic module, a dynamic range expansion (DRE) module, and a first dynamic range compression (DRC) module to generate a first RGB image.

In addition, it can be further learned from FIG. 4 that the photographing apparatus may further include a color correction (color correction matrix, CCM) module, a maximum luminance calculation (maxLuminance calculate) module, a second dynamic range compression DRC module, and an optical-to-electrical conversion (Gamma) module. To enable a second RGB image obtained by performing color gamut space conversion on the first RGB image to meet a color gamut range in an HDR standard, functions of the color correction module, the maximum luminance calculation module, and the optical-to-electrical conversion module in the photographing apparatus provided in the present disclosure are modified. The color correction module can be configured to perform color gamut space conversion on the first RGB image, so that the second RGB image obtained through conversion can meet the color gamut range in the HDR standard. The maximum luminance calculation module is mainly configured to determine a maximum luminance of each frame of image in the second RGB image, so that the maximum luminance of each frame of image in the second RGB image can be used to adjust a dynamic range of the second RGB image, where the described dynamic range is a ratio of a brightest part to a darkest part of the image. The optical-to-electrical conversion module is mainly configured to complete optical-to-electrical conversion according to a corresponding HDR standard, to generate a PQ curve meeting the corresponding HDR standard.

302: The photographing apparatus converts the first RGB image into a second RGB image, where the second RGB image is an image meeting a BT2020 color gamut range.

In this embodiment, after generating the first RGB image, the photographing apparatus may convert the first RGB image into the second RGB image that can meet the color gamut range in the HDR standard. It should be noted that the color gamut range in the HDR standard is BT2020, and therefore the second RGB image is an image meeting the BT2020 color gamut range. The described BT2020 color gamut range may be understood as the color gamut range Rec.2020 & Rec.2100 in the HDR standard in FIG. 1. This is not limited herein.

In some examples, the photographing apparatus may convert the first RGB image into the second RGB image in the following manner:

determining a first conversion matrix, where the first conversion matrix is a conversion matrix meeting the BT2020 color gamut range; and determining the second RGB image based on the first conversion matrix and the first RGB image.

That is, the photographing apparatus needs to first determine a conversion matrix meeting the BT2020 color gamut range, that is, the first conversion matrix; and then convert the first RGB image based on the first conversion matrix to generate the corresponding second RGB image.

Specifically, refer to the following formula for understanding:

$$\begin{bmatrix} R \\ G \\ B \end{bmatrix}_{BT2020} = M_{BT2020} \begin{bmatrix} X \\ Y \\ Z \end{bmatrix}_{Sensor\,RGB},$$

where the first RGB image is expressed as $$\begin{bmatrix} X \\ Y \\ Z \end{bmatrix}_{Sensor\,RGB},$$

BT2020 indicates the first conversion matrix, and the second RGB image is expressed as $$\begin{bmatrix} R \\ G \\ B \end{bmatrix}_{BT2020}.$$

In addition, R, G, and B in the second RGB image respectively indicate red, green, and blue pixel values in the second RGB image, and X, Y, and Z in the first RGB image respectively indicate components of pixel values of the first RGB image in three-dimensional coordinates X, Y, and Z.

The first conversion matrix $M_{BT2020}$ may be obtained based on the following formula:

$$M_{BT2020} = \begin{bmatrix} S_r X_r & S_g X_g & S_b X_b \\ S_r Y_r & S_g Y_g & S_b Y_b \\ S_r Z_r & S_g Z_g & S_b Z_b \end{bmatrix}^{-1};$$

$$X_r = \frac{x_r}{y_r}, \; Y_r = 1, \; \text{and } Z_r = (1 - x_r - y_r);$$

$$X_g = \frac{x_g}{y_g}, \; Y_g = 1, \; \text{and } Z_g = (1 - x_g - y_g);$$

$$X_b = \frac{x_b}{y_b}, \; Y_b = 1, \; \text{and } Z_b = (1 - x_b - y_b); \; \text{and}$$

$$\begin{bmatrix} S_r \\ S_g \\ S_b \end{bmatrix} = \begin{bmatrix} X_r & X_g & X_b \\ Y_r & Y_g & Y_b \\ Z_r & Z_g & Z_b \end{bmatrix}^{-1} \begin{bmatrix} X_w \\ Y_w \\ Z_w \end{bmatrix}, \; \text{where}$$

$S_r$, $S_g$, and $S_b$ are coefficients, $X_r + Y_r + Z_r = 1$, $X_g + Y_g + Z_g = 1$, $X_b + Y_b + Z_b = 1$, $X_r$, $Y_r$, and $Z_r$ respectively indicate red pixel values of the first RGB image in an x-axis direction, a y-axis direction, and a z-axis direction, $X_w$, $Y_w$, and $Z_w$ respectively indicate white pixel values of the first RGB image in the x-axis direction, the y-axis direction, and the z-axis direction, $X_g$, $Y_g$, and $Z_g$ may be understood with reference to the descriptions of $X_r$, $Y_r$, and $Z_r$, and $X_b$, $Y_b$, and $Z_b$ may also be understood with reference to the descriptions of $X_r$, $Y_r$, and $Z_r$.

303: The photographing apparatus determines a first luminance value corresponding to the second RGB image, where the first luminance value indicates a maximum luminance of each frame of image in the second RGB image.

In this embodiment, after converting the first RGB image into the second RGB image meeting the BT2020 color gamut range, the photographing apparatus may further determine the maximum luminance of each frame of image corresponding to the second RGB image, so that a dynamic range of the second RGB image can be adjusted by using the maximum luminance, to determine a target image.

Specifically, the photographing apparatus may determine the first luminance value corresponding to the second RGB image in the following manner:

S3021: Before the first luminance value corresponding to the second RGB image is determined, obtain first information, where the first information indicates an aperture value, an exposure time, a gain value, or optical-to-electrical conversion efficiency of the photographing apparatus.

S3022: Determine a second conversion matrix and a white balance matrix, where the second conversion matrix is used to indicate conversion between a luminance value of an RGB image sensed by the photographing apparatus and a luminance value of an image in a preset observer space.

S3023: Determine a second luminance value based on the second RGB image, the first conversion matrix, the second conversion matrix, the white balance matrix, and the first information, where the second luminance value indicates the luminance of each frame of image in the second RGB image.

S3024: Determine the first luminance value based on the second luminance value, the first conversion matrix, the second conversion matrix, the white balance matrix, and the first information.

The determining of a second conversion matrix and a white balance matrix in S3022 may be further understood in the following manner: determining a third luminance value based on the second RGB image and the first information, where the third luminance value indicates a luminance of each frame of image in the first RGB image; obtaining a luminance value of an image in a preset observer space; determining the second conversion matrix based on the third luminance value and the luminance value of the image in the preset observer space; and performing white balance on the luminance value of the image in the preset observer space to obtain the white balance matrix.

That is, this is understood as follows: When determining the first luminance value corresponding to the second RGB image, the photographing apparatus first needs to obtain the first information, that is, an aperture value, an exposure time, a gain value, or optical-to-electrical conversion efficiency of the photographing apparatus in a current frame of image.

Then the third luminance value is determined based on the second RGB image and the first information, so that the third luminance value indicates the luminance of each frame of image in the first RGB image. That is, the third luminance value is an actual luminance value that can be sensed by the photographing apparatus in the first RGB image.

Refer to the following formula for understanding:

$$\begin{bmatrix} X \\ Y \\ Z \end{bmatrix}_{sensor} = A \times T \times ISO \times Q \times \int_{380}^{760} \text{Light}() \times \text{reference}()d\lambda, \text{ where}$$

A indicates the aperture value, T indicates the exposure time, ISO indicates the gain value, Q indicates the optical-to-electrical conversion efficiency, a value obtained through integration indicates a user-defined luminance value, and the third luminance value is expressed as $$\begin{bmatrix} X \\ Y \\ Z \end{bmatrix}_{sensor}.$$

Then the luminance value of the image in the preset observer space is obtained, and the second conversion matrix is determined based on the third luminance value and the luminance value of the image in the preset observer space.

Figure 5:
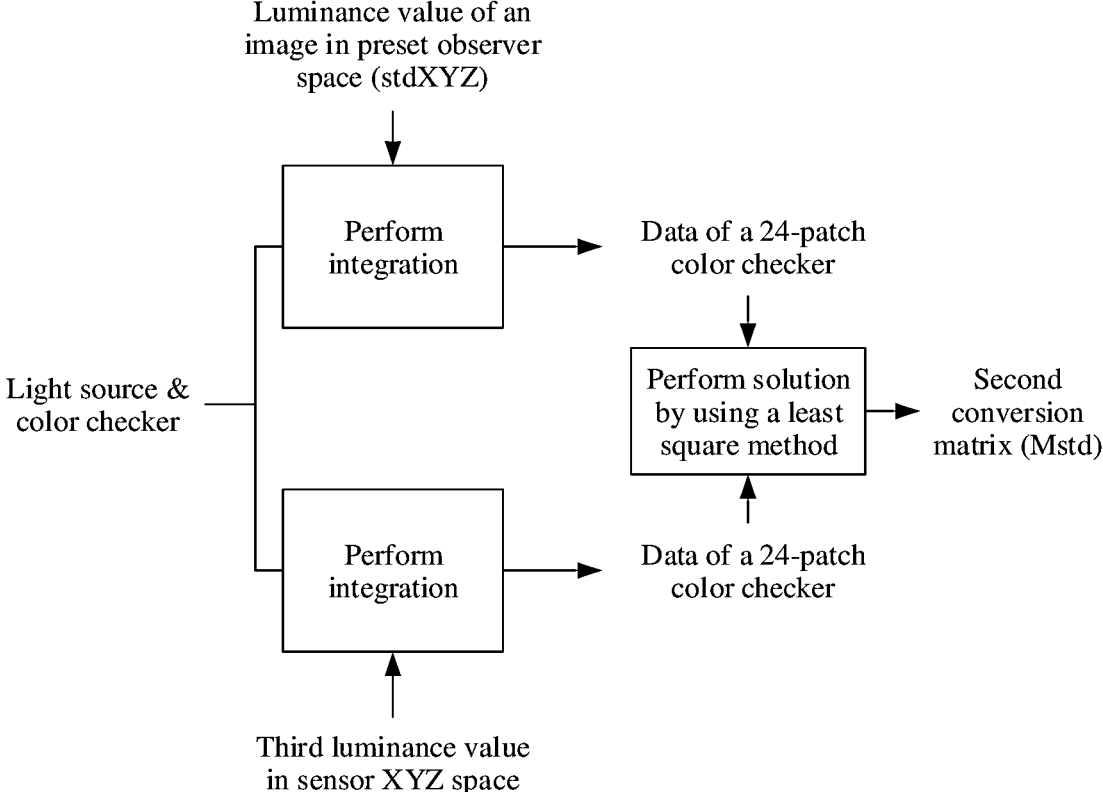
FIG. 5 is a schematic diagram of calculating a second conversion matrix according to an embodiment of the present disclosure.

That is, the luminance value of the image in the preset observer space can be learned by photographing the photographed object, where the luminance value represents perception of eyes of a user for color luminance. Therefore, after the third luminance value is obtained, the second conversion matrix used for converting the third luminance value into the luminance value of the image in the preset observer space needs to be calculated. For example, refer to a schematic diagram in FIG. 5 for understanding. As shown in FIG. 5, integration is performed on a luminance value of an image in preset observer space (stdXYZ), integration is performed on a third luminance value described in sensor XYZ space, and solution is performed by using a least square method with reference to data of a 24-patch color checker, to finally obtain the described second conversion matrix, which is denoted as $M_{std}$.

Then white balancing is performed on the luminance value of the image in the preset observer space to obtain the white balance matrix, which is denoted as $M_{wb}$.

Further, the second luminance value is determined based on the second RGB image, the first conversion matrix, the second conversion matrix, the white balance matrix, and the first information, where the second luminance value indicates the luminance of each frame of image in the second RGB image.

Specifically, refer to the following formula for understanding:

$$\begin{bmatrix} R \\ G \\ B \end{bmatrix}_{sensor} =$$

$$M_{BT2020} \times M_{wb} \times M_{std} \times A \times T \times ISO \times Q \times \int_{380}^{760} \text{Light}() \times \text{reference}()d\lambda,$$

where the luminance of each frame of image in the second RGB image is expressed as $$\begin{bmatrix} R \\ G \\ B \end{bmatrix}_{sensor}.$$

Finally, the first luminance value is determined based on the second luminance value, the first conversion matrix, the second conversion matrix, the white balance matrix, and the first information.

Specifically, refer to the following formula for understanding:

$$\text{Max } Lu\min ance = (M_{BT2020} \times M_{wb} \times M_{std} \times A \times T \times ISO \times Q)^{-1} \times \begin{bmatrix} R \\ G \\ B \end{bmatrix}_{sensor},$$

where MaxLuminance indicates the first luminance value.

In this way, the first luminance value can be determined based on the second luminance value, the first conversion matrix, the second conversion matrix, the white balance matrix, and the first information, and then the maximum luminance corresponding to each frame of image in the second RGB image can be indicated by using the first luminance value.

304: The photographing apparatus determines a target image based on the first luminance value and the second RGB image.

In this embodiment, after the maximum luminance calculation module calculates the first luminance value that can indicate the maximum luminance of each frame of image in the second RGB image, the photographing apparatus may further process the first luminance value and the second RGB image by using the optical-to-electrical conversion module to obtain the target image. Specifically, the optical-to-electrical conversion module can perform optical-to-electrical conversion on the linear second RGB image based on the PQ curve in the HDR standard and with reference to the first luminance value, to generate a non-linear RGB image, that is, determine the target image. For example, the HDR standard is HDR10. The determining the target image may be specifically understood with reference to the following formula:

$$N = \left( \frac{c_1 + c_2 \times L^{m_1}}{1 + c_3 \times L^{m_1}} \right)^{m_2},$$

where

L is MaxLuminance, namely, the first luminance value, N indicates an RGB pixel value of the target image; and $c_1$, $c_2$, $c_3$, $m_1$, and $m_2$ are preset coefficients. For example, $$m_1 = \frac{2610}{4096} \times \frac{1}{4} = 0.1593017578125,$$

$$m_2 = \frac{2523}{4096} \times 128 = 78.84375,$$

$$c_1 = \frac{3424}{4096} = 0.8359375 = c_3 - c_2 + 1,$$

$$c_2 = \frac{2413}{4096} \times 32 = 18.8515625, \text{ and}$$

$$c_3 = \frac{2392}{4096} \times 32 = 18.6875.$$

This is not specifically limited herein.

305: The photographing apparatus sends the target image to a display apparatus.

In this embodiment, after obtaining the target image, the photographing apparatus may send the target image to the display apparatus for processing by the display apparatus. The described target image may be understood as an HDR image meeting the HDR standard.

306: The display apparatus receives the first luminance value sent by the photographing apparatus, where the first luminance value indicates the maximum luminance of each frame of image in the second RGB image, and the second RGB image is an image meeting the BT2020 color gamut range.

Figure 6:
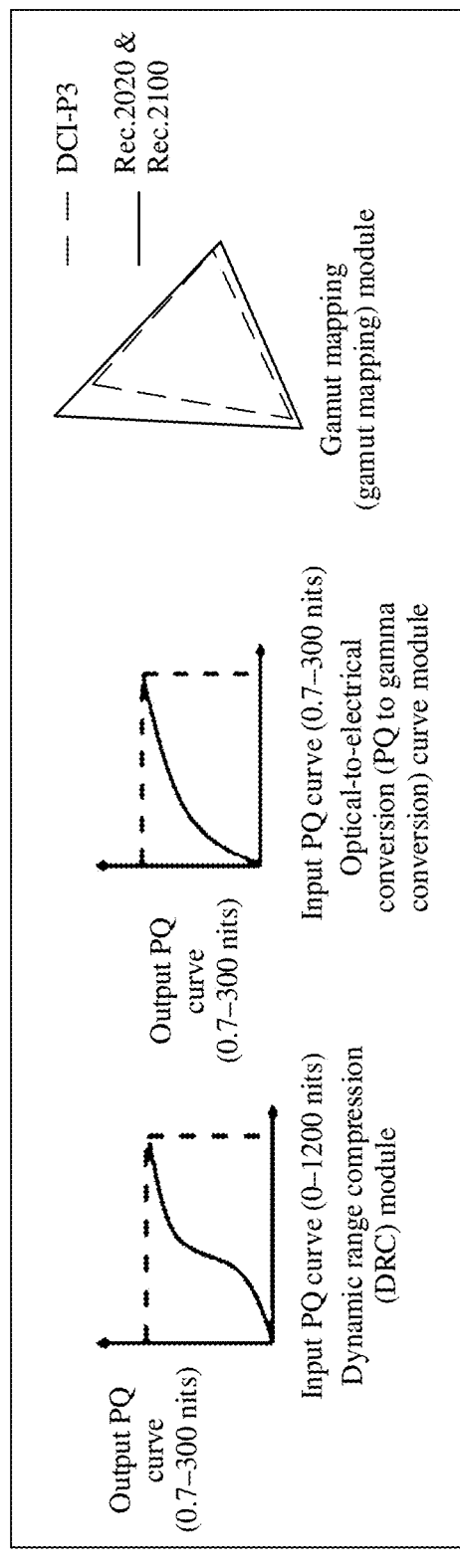
FIG. 6 is a schematic diagram of a display apparatus according to an embodiment of the present disclosure.

Similarly, an objective is to enable the display apparatus to display image details, colors, and the like more clearly. FIG. 6 is a schematic diagram of a display apparatus according to an embodiment of the present disclosure. The display apparatus may include: a module including a dynamic range compression (DRC) module and an optical-to-electrical conversion (PQ to gamma conversion) curve module; and a gamut mapping (GMP) module. The module including the dynamic range compression module and the optical-to-electrical conversion curve module can perform dynamic range compression or expansion based on a display capability of the display apparatus, to restore details in the case of high luminance or details in the case of low luminance to the maximum extent. The gamut mapping module can perform color remapping based on a color display capability of the display apparatus, to ensure an image color restoration capability to the maximum extent.

307: The display apparatus obtains display information, where the display information indicates the display capability of the display apparatus.

In this embodiment, the display information can indicate the display capability of the display apparatus, that is, a degree of displaying, by the display apparatus, a color and luminance of the target image when displaying the target image. The described display capability includes a capability of displaying a color of an image and a capability of displaying luminance of the image.

308: The display apparatus performs gamut mapping on the target image based on the first luminance value, the display information, and a preset gamut mapping policy, to display a target image obtained through gamut mapping.

In this embodiment, after obtaining the first luminance value and the display information, the display apparatus may further perform luminance and color remapping on the target image with reference to the preset gamut mapping policy, and then display a target image obtained through gamut remapping, so that the finally displayed target image can display richer image details and colors.

The preset gamut mapping policy may include but is not limited to the following five policies.

Figure 7A:
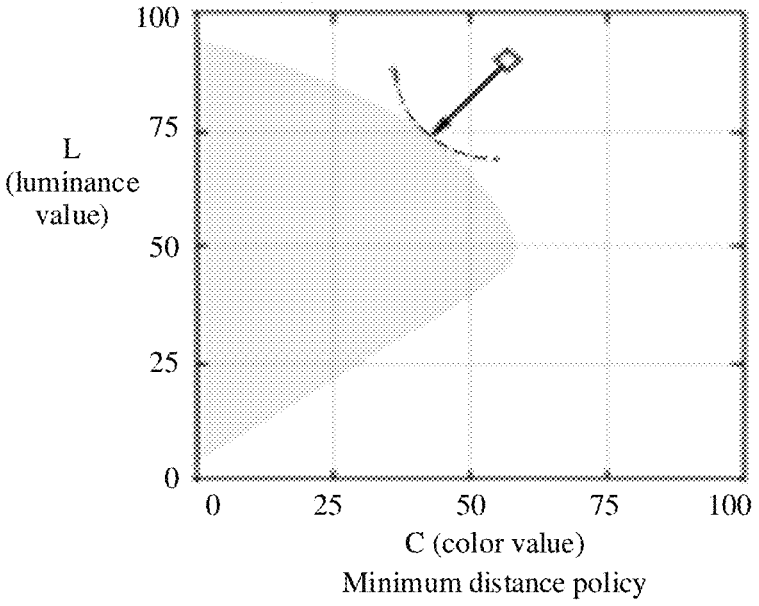
FIG. 7*a* is a schematic diagram of a preset gamut mapping policy according to an embodiment of the present disclosure.

First policy: a minimum distance policy FIG. 7a shows a minimum distance from a white point to the target image. Then a luminance-to-color ratio at the minimum distance is determined. Then gamut mapping is performed on the target image based on the luminance-to-color ratio at the minimum distance.

Figure 7B:
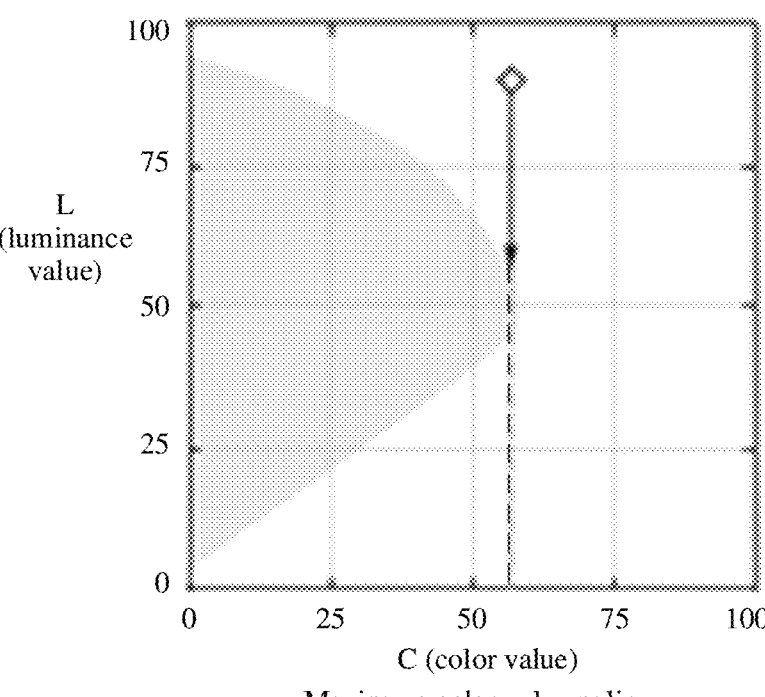
FIG. 7*b* is a schematic diagram of another preset gamut mapping policy according to an embodiment of the present disclosure.

Second policy: a maximum color value policy FIG. 7b shows a gamut mapping status when a luminance value remains unchanged and a white point has a maximum distance from a color value.

Figure 7C:
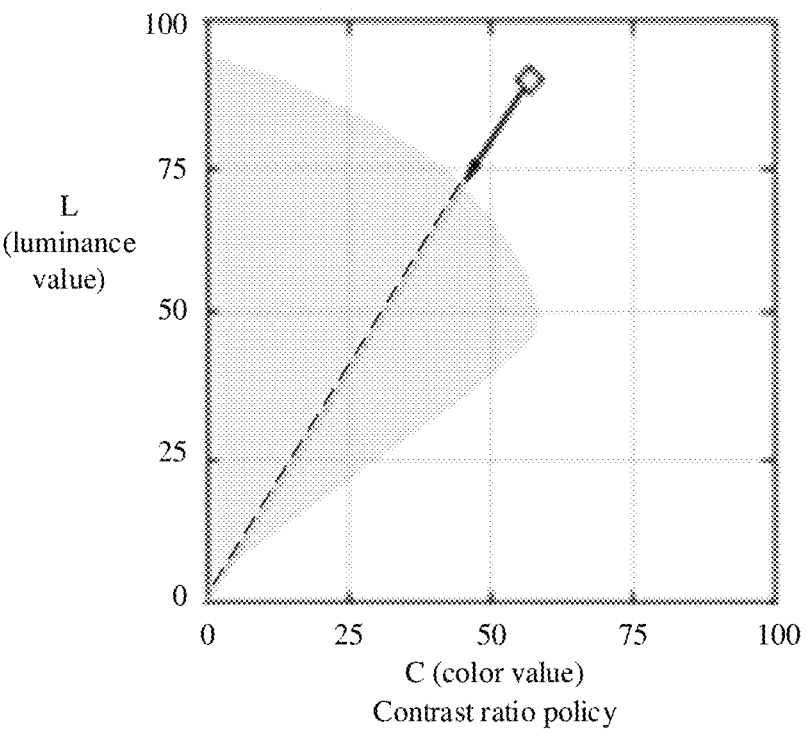
FIG. 7*c* is a schematic diagram of another preset gamut mapping policy according to an embodiment of the present disclosure.

Third policy: a contrast ratio policy FIG. 7c shows a gamut mapping status related to a ratio of a luminance value to a color value.

Figure 7D:
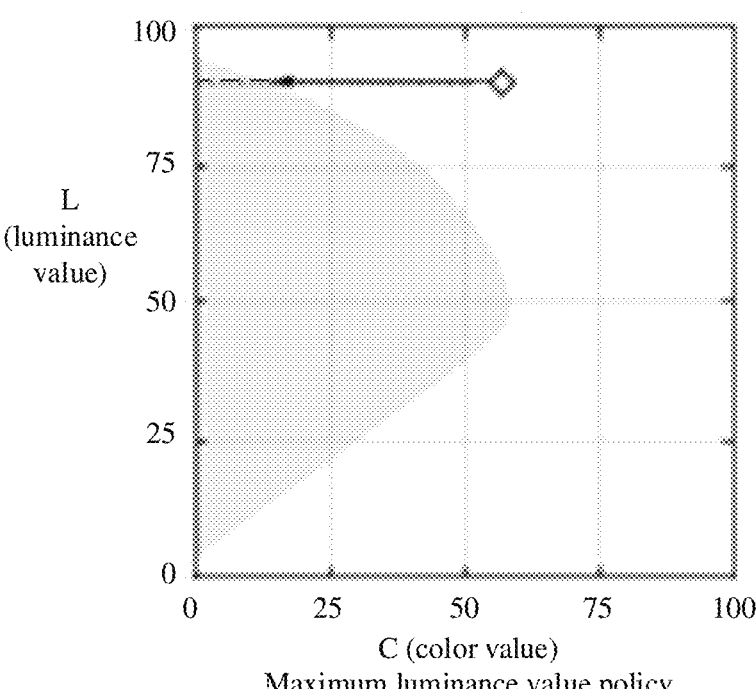
FIG. 7*d* is a schematic diagram of another preset gamut mapping policy according to an embodiment of the present disclosure.

Fourth policy: a maximum luminance value policy FIG. 7d shows a gamut mapping status when a color value remains unchanged and a white point has a maximum distance from a luminance value.

Figure 7E:
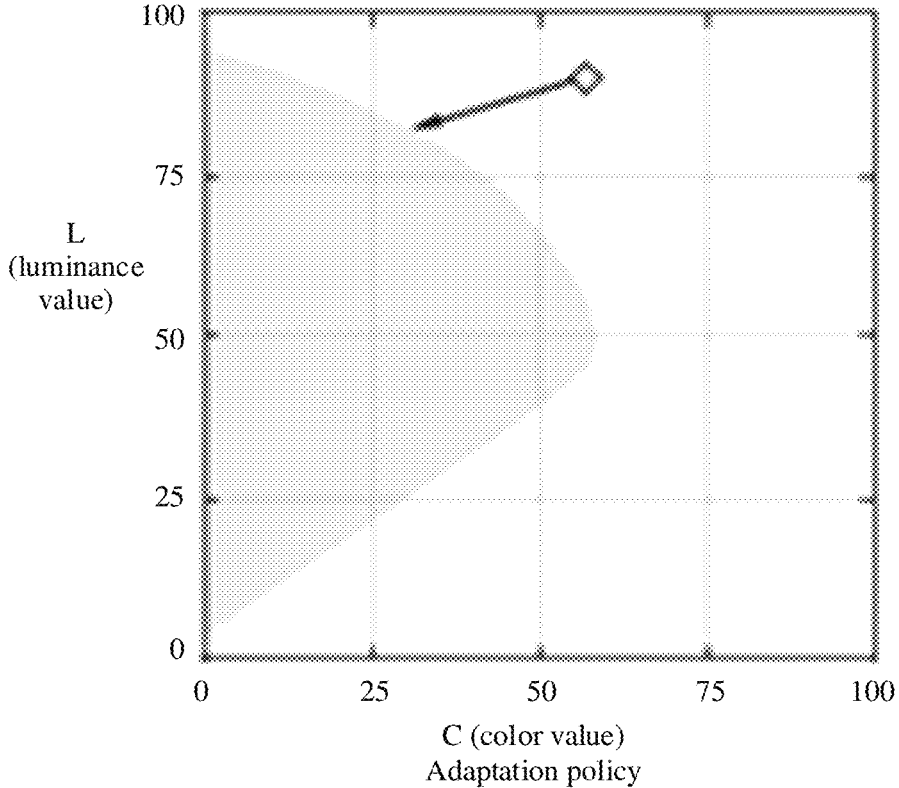
FIG. 7*e* is a schematic diagram of another preset gamut mapping policy according to an embodiment of the present disclosure.

Fifth policy: an adaptation policy FIG. 7e shows a gamut mapping status when distances from a white point to a luminance value and a color value can be adaptively determined.

In some other examples, the method may further include: displaying the target image based on the first luminance value and the display information.

In this embodiment, after obtaining the first luminance value and the display information, the display apparatus may further dynamically adjust a dynamic range of the target image based on the first luminance value and the display information, so that the target image can display image details, colors, and the like to the maximum extent. It may be understood that the described dynamic range is a relative ratio of a brightest part and a darkest part of the image.

Figure 8:
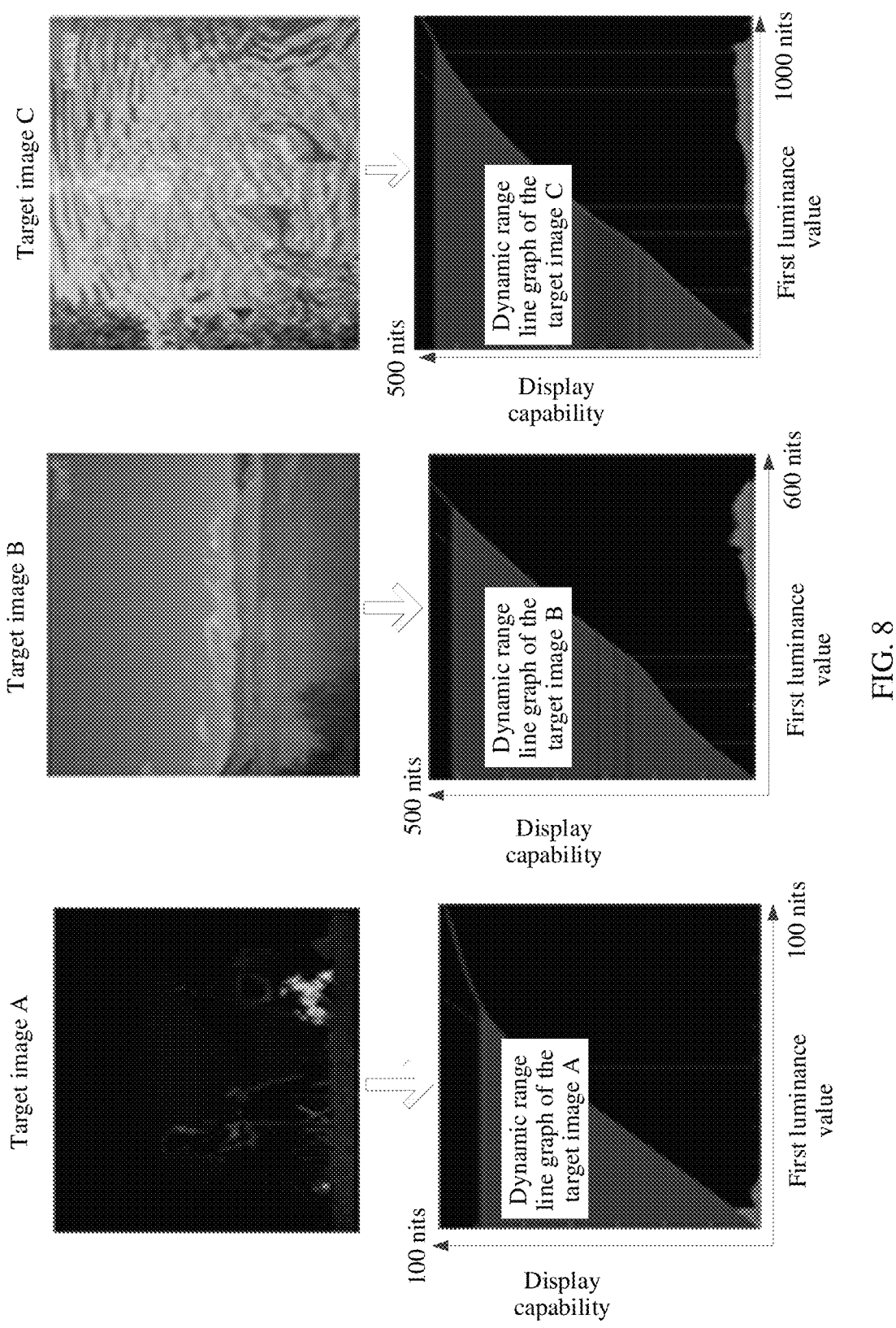
FIG. 8 shows target images and dynamic range adjustment line graphs according to an embodiment of the present disclosure.

For example, FIG. 8 shows a target image A, a target image B, a target image C, and dynamic range adjustment line graphs respectively corresponding to the target images. It can be learned from the dynamic range adjustment line graphs respectively corresponding to the target images that, on a basis that the display information of the display apparatus is 500 nits (nit: a unit of luminance), a first luminance value corresponding to the target image A is 100 nits, a first luminance value corresponding to the target image B is 600 nits, and a first luminance value corresponding to the target image C is 1000 nits. Clearly, it can be learned that a color and luminance of the target image C are better than those of the target image A and the target image B. Therefore, on a basis that the display information indicates a same display capability, a greater first luminance value corresponds to a clearer target image and indicates a larger adjusted dynamic range.

Figure 9A:
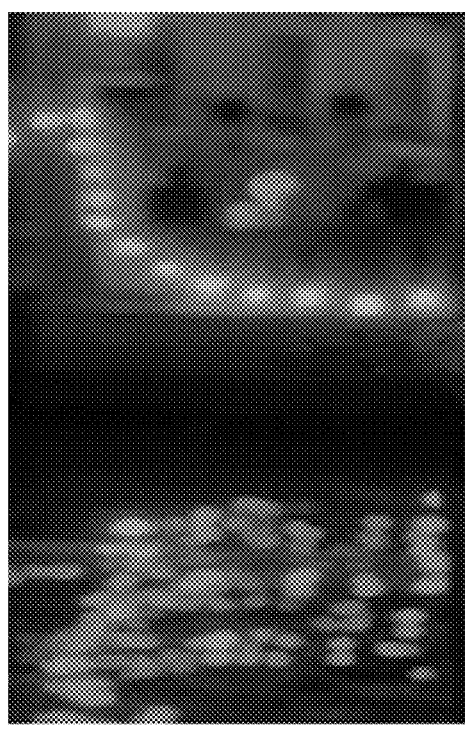
FIG. 9*a* is a schematic diagram of an image to which a solution of the present disclosure is applied.
Figure 9B:
FIG. 9*b* is a schematic diagram of an image to which a solution of the conventional technology is applied.

Therefore, in this embodiment, after obtaining the first RGB image, the photographing apparatus converts the first RGB image into an image meeting the BT2020 color gamut range, and then determines the first luminance value corresponding to the second RGB image, and determines the target image based on the first luminance value and the second RGB image. Further, the display apparatus performs luminance and color remapping on the target image based on the first luminance value, the display information, and the preset gamut mapping policy, so that the finally displayed target image can display richer image details and image colors. This improves image display effects and further improves user experience. FIG. 9a is a schematic diagram of an image to which a solution of the present disclosure is applied. FIG. 9b is a schematic diagram of an image to which a solution of the conventional technology is applied. It can be learned from a result of comparison between FIG. 9a and FIG. 9b that, when a same background wall is photographed and displayed, clearer image details and richer colors can be displayed in FIG. 9a, and an image displayed in FIG. 9b is blurrier.

The foregoing mainly describes solutions provided in embodiments of the present disclosure from a perspective of interaction. It may be understood that, to implement the foregoing functions, the photographing apparatus and the display apparatus include corresponding hardware structures and/or software modules for performing the functions. Persons of ordinary skill in the art should easily be aware that modules, algorithms, and steps in examples described with reference to embodiments disclosed in this specification can be implemented by hardware or a combination of hardware and computer software in the present disclosure. Whether a function is performed by hardware or hardware driven by computer software depends on particular applications and design constraints of technical solutions. Persons skilled in the art may use different methods to implement the described functions for each particular application, but it should not be considered that the implementation goes beyond the scope of the present disclosure.

In embodiments of the present disclosure, the photographing apparatus and the display apparatus may be divided into functional modules based on the method examples. For example, the functional modules may be obtained through division based on corresponding functions, or two or more functions may be integrated into one processing module. The integrated module may be implemented in a form of hardware, or may be implemented in a form of a software functional module. It should be noted that, in embodiments of the present disclosure, division into the modules is an example and is merely logical function division, and may be other division in an actual implementation.

Figure 10:
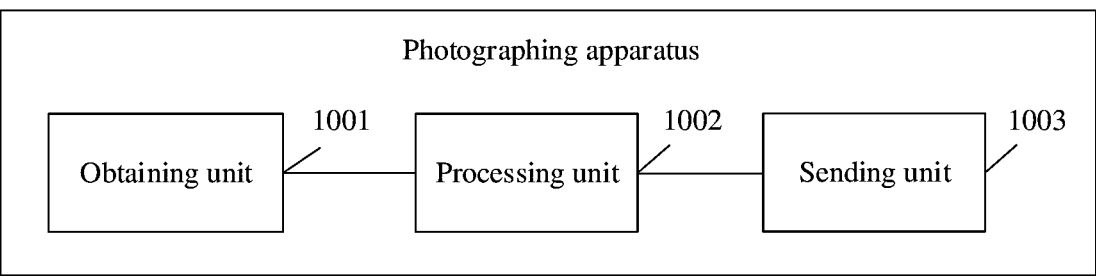
FIG. 10 is a schematic diagram of a structure of a photographing apparatus according to an embodiment of the present disclosure.

The following describes in detail a photographing apparatus in the present disclosure. FIG. 10 is a schematic diagram of an embodiment of a photographing apparatus according to an embodiment of the present disclosure. The photographing apparatus may include:

an obtaining unit 1001, configured to obtain a first RGB image, where the first RGB image is an RGB image sensed by the photographing apparatus;

a processing unit 1002, configured to convert the first RGB image into a second RGB image, where the second RGB image is an image meeting a BT2020 color gamut range, where the processing unit 1002 is configured to determine a first luminance value corresponding to the second RGB image, where the first luminance value indicates a maximum luminance of each frame of image in the second RGB image; and the processing unit 1002 is configured to determine a target image based on the first luminance value and the second RGB image; and a sending unit 1003, configured to send the target image by a display apparatus, so that the display apparatus displays the target image.

In some examples, the processing unit 1002 may be further configured to:

determine a first conversion matrix, where the first conversion matrix is a conversion matrix meeting the BT2020 color gamut range; and determine the second RGB image based on the first conversion matrix and the first RGB image.

In some examples, the obtaining unit 1001 may be further configured to: before the first luminance value corresponding to the second RGB image is determined, obtain first information, where the first information indicates an aperture value, an exposure time, a gain value, or optical-to-electrical conversion efficiency of the photographing apparatus; and the processing unit 1002 may be further configured to:

determine a second conversion matrix and a white balance matrix, where the second conversion matrix is used to indicate conversion between a luminance value of an RGB image sensed by the photographing apparatus and a luminance value of an image in a preset observer space;

determine a second luminance value based on the second RGB image, the first conversion matrix, the second conversion matrix, the white balance matrix, and the first information, where the second luminance value indicates a luminance of each frame of image in the second RGB image; and determine the first luminance value based on the second luminance value, the first conversion matrix, the second conversion matrix, the white balance matrix, and the first information.

In some examples, the processing unit 1002 is further configured to:

determine a third luminance value based on the second RGB image and the first information, where the third luminance value indicates a luminance of each frame of image in the first RGB image;

obtain a luminance value of an image in a preset observer space;

determine the second conversion matrix based on the third luminance value and the luminance value of the image in the preset observer space; and perform white balancing on the luminance value of the image in the preset observer space to obtain the white balance matrix.

Figure 11:
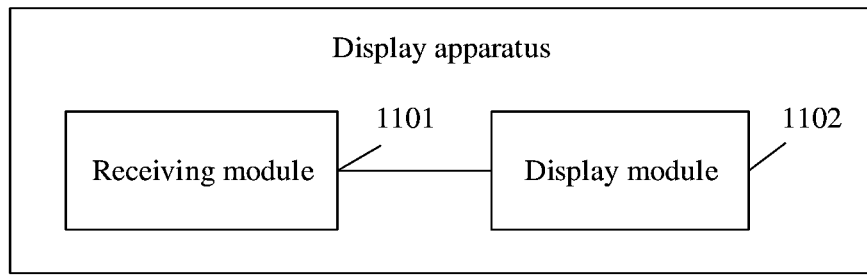
FIG. 11 is a schematic diagram of a structure of a display apparatus according to an embodiment of the present disclosure.

The foregoing mainly describes the photographing apparatus in the present disclosure. The following describes in detail a display apparatus in the present disclosure. FIG. 11 is a schematic diagram of an embodiment of a display apparatus according to an embodiment of the present disclosure. The display apparatus 110 includes:

a receiving module 1101, configured to receive a target image sent by a photographing apparatus; and a display module 1102, configured to display the target image.

In some examples, the receiving module 1101 is further configured to:

after receiving the target image sent by the photographing apparatus, receive a first luminance value sent by the photographing apparatus, where the first luminance value indicates a maximum luminance of each frame of image in a second RGB image, and the second RGB image is an image meeting a BT2020 color gamut range; and obtain display information, where the display information indicates a display capability of the display apparatus; and correspondingly, the display module 1102 is further configured to:

perform gamut mapping on the target image based on the first luminance value, the display information, and a preset gamut mapping policy, to display a target image obtained through gamut mapping.

In some examples, the display apparatus may further include:

a processing module, configured to adjust a dynamic range of the target image based on the first luminance value and the display information.

It should be noted that content such as information exchange between the modules/units of the apparatus and the execution processes thereof is based on the same concept as the method embodiments of the present disclosure, and produces the same technical effects as the method embodiments of the present disclosure. For specific content, refer to the descriptions in the method embodiments of the present disclosure.

Figure 12:
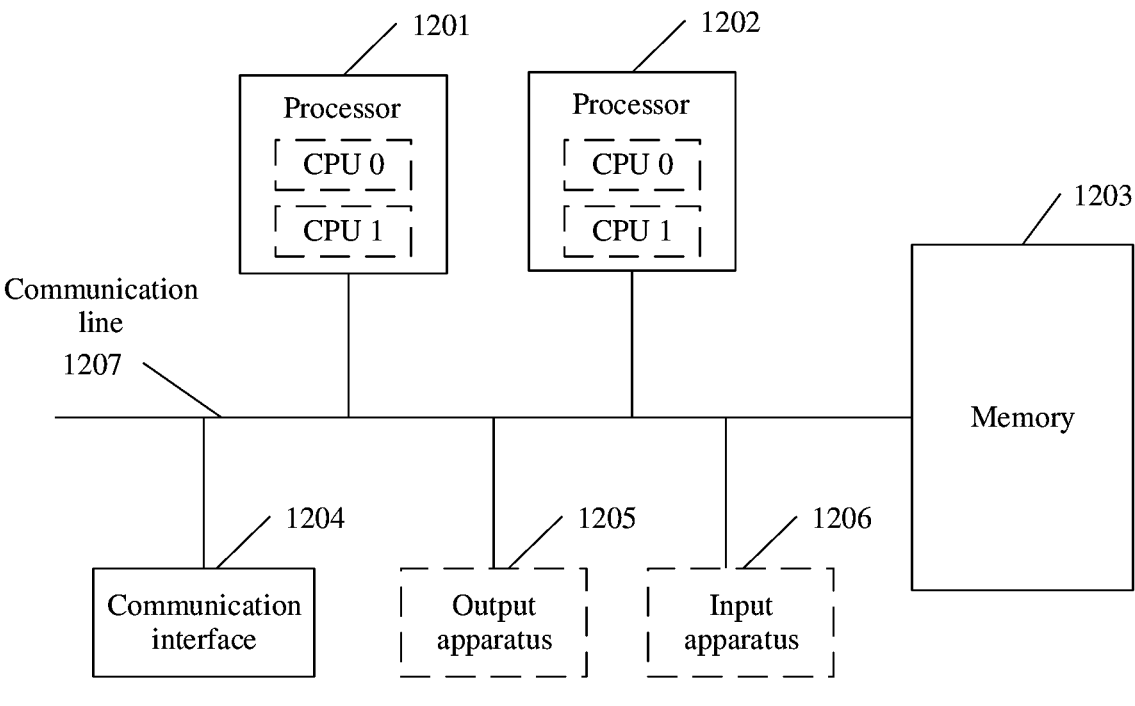
FIG. 12 is a schematic diagram of a hardware structure of a communication apparatus according to an embodiment of the present disclosure.

The foregoing describes the photographing apparatus and the display apparatus in embodiments of the present disclosure from a perspective of a modular functional entity. The following describes the photographing apparatus and the display apparatus in embodiments of the present disclosure from a perspective of hardware processing. FIG. 12 is a schematic diagram of a hardware structure of a communication apparatus according to an embodiment of the present disclosure. As shown in FIG. 12, the communication apparatus may include:

at least one processor 1201, a communication line 1207, a memory 1203, and at least one communication interface 1204.

The processor 1201 may be a general-purpose central processing unit (CPU), a microprocessor, an application-specific integrated circuit (ASIC), or one or more integrated circuits configured to control program execution of solutions in the present disclosure.

The communication line 1207 may include a channel for transmitting information between the foregoing components.

The communication interface 1204 is any apparatus like a transceiver, and is configured to communicate with another apparatus or a communication network, for example, Ethernet.

The memory 1203 may be a read-only memory (ROM), another type of static storage apparatus capable of storing static information and instructions, a random access memory (RAM), or another type of dynamic storage apparatus capable of storing information and instructions. The memory may exist independently, and is connected to the processor 1201 through the communication line 1207. The memory may alternatively be integrated with the processor 1201.

The memory 1203 is configured to store computer-executable instructions for performing solutions in the present disclosure, and the processor 1201 controls execution of the computer-executable instructions. The processor 1201 is configured to execute the computer-executable instructions stored in the memory 1203, to implement the image processing method provided in the foregoing embodiments of the present disclosure.

Optionally, the computer-executable instructions in this embodiment of the present disclosure may also be referred to as application program code. This is not specifically limited in this embodiment of the present disclosure.

During specific implementation, in an embodiment, the communication apparatus may include a plurality of processors, for example, a processor 1201 and a processor 1202 in FIG. 12. Each of the processors may be a single-core (single-CPU) processor, or may be a multi-core (multi-CPU) processor. The processor herein may be one or more apparatuses, circuits, and/or processing cores configured to process data (for example, computer program instructions).

During specific implementation, in an embodiment, the communication apparatus may further include an output apparatus 1205 and an input apparatus 1206. The output apparatus 1205 communicates with the processor 1201, and may display information in a plurality of manners. The input apparatus 1206 communicates with the processor 1201, and may receive a user input in a plurality of manners. For example, the input apparatus 1206 may be a mouse, a touchscreen apparatus, or a sensing apparatus.

The communication apparatus may be a general-purpose apparatus or a dedicated apparatus. During specific implementation, the communication apparatus may be a portable computer, a mobile terminal, an apparatus with a structure similar to that in FIG. 12, or the like. A type of the communication apparatus is not limited in this embodiment of the present disclosure.

All or some of the foregoing embodiments may be implemented by software, hardware, firmware, or any combination thereof. When software is used to implement the embodiments, all or some of the embodiments may be implemented in a form of a computer program product.

It may be clearly understood by persons skilled in the art that, for the purpose of convenient and brief description, for specific operating processes of the photographing apparatus, the display apparatus, the units, and the modules described above, reference may be made to corresponding processes in the method embodiments.

In several embodiments provided in the present disclosure, it should be understood that the disclosed device and method may be implemented in other manners. For example, the described embodiments of the photographing apparatus and the display apparatus are merely examples. For example, division into the units is merely logical function division and may be other division during actual implementation. For example, a plurality of units or components may be combined or integrated into another system, or some features may be ignored or not performed. In addition, the shown or discussed mutual couplings or direct couplings or communication connections may be implemented through some interfaces. The indirect couplings or communication connections between the modules or units may be implemented in electronic, mechanical, or other forms.

The units described as separate parts may or may not be physically separate, and parts shown as units may or may not be physical units, that is, may be located in one place, or may be distributed on a plurality of network units. Some or all of the units may be selected according to actual requirements to achieve objectives of solutions of embodiments.

In addition, functional units in embodiments of the present disclosure may be integrated into one processing unit, each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure essentially, or a part contributing to the conventional technology, or all or some of the technical solutions may be implemented in a form of a software product. The computer software product is stored in a storage medium and includes several instructions for instructing a computer device (which may be a personal computer, a server, a network device, or the like) to perform all or some of the steps of the methods in embodiments of the present disclosure. The storage medium includes any medium that can store program code, for example, a USB flash drive, a removable hard disk, a read-only memory (ROM), a random access memory (RAM), a magnetic disk, or an optical disc.

The foregoing embodiments are merely intended to describe the technical solutions of the present disclosure, but not to limit the present disclosure. Although the present disclosure is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of embodiments of the present disclosure.

What is claimed is:

1. An image processing method, applied to a photographing apparatus, wherein the method comprises:
   obtaining a first RGB image sensed by the photographing apparatus;
   converting the first RGB image into a second RGB image meeting a BT2020 color gamut range;
   determining a first luminance value corresponding to the second RGB image, wherein the first luminance value indicates a maximum luminance of each frame of image in the second RGB image;
   determining a target image based on the first luminance value and the second RGB image; and
   sending the target image to a display apparatus, so that the display apparatus displays the target image,
   wherein the converting the first RGB image into a second RGB image comprises:
   determining a first conversion matrix meeting the BT2020 color gamut range; and
   determining the second RGB image based on the first conversion matrix and the first RGB image,
   wherein, before the determining a first luminance value corresponding to the second RGB image, the method further comprises:
   obtaining first information indicating an aperture value, an exposure time, a gain value, or optical-to-electrical conversion efficiency of the photographing apparatus; and the determining a first luminance value corresponding to the second RGB image comprises:
   determining a second conversion matrix and a white balance matrix, wherein the second conversion matrix indicates conversion between a luminance value of an RGB image sensed by the photographing apparatus and a luminance value of an image in a preset observer space;
   determining a second luminance value based on the second RGB image, the first conversion matrix, the second conversion matrix, the white balance matrix, and the first information, wherein the second luminance value indicates a luminance of each frame of image in the second RGB image; and
   determining the first luminance value based on the second luminance value, the first conversion matrix, the second conversion matrix, the white balance matrix, and the first information.

2. The method according to claim 1, wherein the determining a second conversion matrix and a white balance matrix comprises:
   determining a third luminance value based on the second RGB image and the first information, wherein the third luminance value indicates a luminance of each frame of image in the first RGB image;
   obtaining a luminance value of an image in a preset observer space;
   determining the second conversion matrix based on the third luminance value and the luminance value of the image in the preset observer space; and
   performing white balancing on the luminance value of the image in the preset observer space to obtain the white balance matrix.

3. The method according to claim 1, wherein the second RGB image is calculated according to the following formula:

$$\begin{bmatrix} R \\ G \\ B \end{bmatrix}_{BT2020} = M_{BT2020} \begin{bmatrix} X \\ Y \\ Z \end{bmatrix}_{SensorRGB},$$

where
the first RGB image is expressed as, $$\begin{bmatrix} X \\ Y \\ Z \end{bmatrix}_{SensorRGB},$$

$M_{BT2020}$ indicates the first conversion matrix, and the second RGB image is expressed as $$\begin{bmatrix} R \\ G \\ B \end{bmatrix}_{BT2020},$$

R, G, and B in the second RGB image respectively indicate red, green, and blue pixel values in the second RGB image, and X, Y, and Z in the first RGB image respectively indicate components of pixel values of the first RGB image in three-dimensional coordinates X, Y, and Z.

4. The method according to claim 3, wherein the first conversion matrix $M_{BT2020}$ is obtained according to the following formula:

$$M_{BT2020} = \begin{bmatrix} S_r X_r & S_g X_g & S_b X_b \\ S_r Y_r & S_g Y_g & S_b Y_b \\ S_r Z_r & S_g Z_g & S_b Z_b \end{bmatrix}^{-1};$$

$$X_r = \frac{x_r}{y_r}, \ Y_r = 1, \text{ and } Z_r = (1 - x_r - y_r);$$

$$X_g = \frac{x_g}{y_g}, \ Y_g = 1, \text{ and } Z_g = (1 - x_g - y_g);$$

$$X_b = \frac{x_b}{y_b}, \ Y_b = 1, \text{ and } Z_b = (1 - x_b - y_b); \text{ and}$$

$$\begin{bmatrix} S_r \\ S_g \\ S_b \end{bmatrix} = \begin{bmatrix} X_r & X_g & X_b \\ Y_r & Y_g & Y_b \\ Z_r & Z_g & Z_b \end{bmatrix}^{-1} \begin{bmatrix} X_w \\ Y_w \\ Z_w \end{bmatrix}, \text{ where}$$

$S_r$, $S_g$, and $S_b$ are coefficients, $X_r + Y_r + Z_r = 1$, $X_g + Y_g + Z_g = 1$, $X_b + Y_b + Z_b = 1$, $X_r$, $Y_r$, and $Z_r$ respectively indicate red pixel values of the first RGB image in an x-axis direction, a y-axis direction, and a z-axis direction, $X_w$, $Y_w$, and $Z_w$ respectively indicate white pixel values of the first RGB image in the x-axis direction, the y-axis direction, and the z-axis direction, $X_g$, $Y_g$, and $Z_g$ respectively indicate green pixel values of the first RGB image in an x-axis direction, a y-axis direction, and a z-axis direction, and $X_b$, $Y_b$, and $Z_b$ respectively indicate blue pixel values of the first RGB image in an x-axis direction, a y-axis direction, and a z-axis direction.

5. The method according to claim 1, wherein the determining the target image based on the first luminance value and the second RGB image comprises performing optical-to-electrical conversion on the second RGB image based on a PQ curve in an HDR standard and with reference to the first luminance value, to generate a non-linear RGB image as the target image.

6. The method according to claim 5, wherein the HDR standard is HDR10.

7. An image processing method, applied to a display apparatus, wherein the method comprises:

receiving a target image sent by a photographing apparatus; and displaying the target image, wherein the target image is determined by the photographing apparatus based on a second RGB image and a first luminance value corresponding to the second RGB image, the second RGB image is converted from a first RGB image sensed by the photographing apparatus and meets a BT2020 color gamut range, and the first luminance value indicates a maximum luminance of each frame of image in the second RGB image, wherein after the receiving a target image sent by a photographing apparatus, the method further comprises:

receiving the first luminance value sent by the photographing apparatus; and obtaining display information, wherein the display information indicates a display capability of the display apparatus; and the displaying the target image comprises:

performing gamut mapping on the target image based on the first luminance value, the display information, and a preset gamut mapping policy, to display a target image obtained through gamut mapping.

8. The method according to claim 7, further comprising: adjusting a dynamic range of the target image based on the first luminance value and the display information.

9. The method according to claim 7, wherein the performing gamut mapping on the target image based on the first luminance value, the display information, and the preset gamut mapping policy comprises performing luminance and color remapping on the target image with reference to the preset gamut mapping policy, and then displaying a target image obtained through gamut remapping.

10. The method according to claim 9, wherein the preset gamut mapping policy comprises:

determining a minimum distance from a white point to the target image, determining a luminance-to-color ratio at the minimum distance, and performing gamut mapping on the target image based on the luminance-to-color ratio at the minimum distance; or determining a gamut mapping status when a luminance value remains unchanged and a white point has a maximum distance from a color value; or determining a gamut mapping status related to a ratio of a luminance value to a color value; or determining a gamut mapping status when a color value remains unchanged and a white point has a maximum distance from a luminance value; or determining a gamut mapping status when distances from a white point to a luminance value and a color value are adaptively determined.

11. A photographing apparatus, comprising at least one processor, and a memory storing information comprising instructions that, when executed by the at least one processor, control the photographing apparatus to perform operations comprising:

obtaining a first RGB image sensed by the photographing apparatus;

converting the first RGB image into a second RGB image meeting a BT2020 color gamut range, wherein determining a first luminance value corresponding to the second RGB image, wherein the first luminance value indicates a maximum luminance of each frame of image in the second RGB image; and determining a target image based on the first luminance value and the second RGB image; and sending the target image to a display apparatus, so that the display apparatus displays the target image, wherein the converting of the first RGB image into the second RGB image comprises:

determining a first conversion matrix meeting the BT2020 color gamut range; and determining the second RGB image based on the first conversion matrix and the first RGB image, wherein, before the first luminance value corresponding to the second RGB image is determined, first information is obtained, and the first information indicates an aperture value, an exposure time, a gain value, or optical-to-electrical conversion efficiency of the photographing apparatus; and wherein the determining of the first luminance value corresponding to the second RGB image comprises:

determining a second conversion matrix and a white balance matrix, wherein the second conversion matrix is used to indicate conversion between a luminance value of an RGB image sensed by the photographing apparatus and a luminance value of an image in a preset observer space;

determining a second luminance value based on the second RGB image, the first conversion matrix, the second conversion matrix, the white balance matrix, and the first information, wherein the second luminance value indicates a luminance of each frame of image in the second RGB image; and determining the first luminance value based on the second luminance value, the first conversion matrix, the second conversion matrix, the white balance matrix, and the first information.

12. The photographing apparatus according to claim 11, wherein the determining of the second conversion matrix and the white balance matrix comprises:

determining a third luminance value based on the second RGB image and the first information, wherein the third luminance value indicates a luminance of each frame of image in the first RGB image;

obtaining a luminance value of an image in a preset observer space;

determining the second conversion matrix based on the third luminance value and the luminance value of the image in the preset observer space; and performing white balancing on the luminance value of the image in the preset observer space to obtain the white balance matrix.

\* \* \* \* \*